US012608160B2

(12) United States Patent
Zhang et al.

(10) Patent No.: US 12,608,160 B2
(45) Date of Patent: Apr. 21, 2026

(54) METHOD AND APPARATUS FOR MERGING INSTRUCTIONS TO BE PROCESSED, AND NON-TRANSIENT COMPUTER-READABLE STORAGE MEDIUM

(71) Applicant: BEIJING XIAOMI MOBILE SOFTWARE CO., LTD., Beijing (CN)

(72) Inventors: Jun Zhang, Beijing (CN); Xinghui Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 72 days.

(21) Appl. No.: 18/577,220

(22) PCT Filed: Apr. 29, 2022

(86) PCT No.: PCT/CN2022/090331
§ 371 (c)(1),
(2) Date: Jan. 5, 2024

(87) PCT Pub. No.: WO2023/108989
PCT Pub. Date: Jun. 22, 2023

(65) Prior Publication Data
US 2024/0320009 A1 Sep. 26, 2024

(30) Foreign Application Priority Data
Dec. 16, 2021 (CN) .......................... 202111543913.4

(51) Int. Cl.
*G06F 3/06* (2006.01)
*G06F 13/16* (2006.01)
(52) U.S. Cl.
CPC ............ *G06F 3/0659* (2013.01); *G06F 3/061* (2013.01); *G06F 3/0671* (2013.01); *G06F 13/1642* (2013.01)

(58) Field of Classification Search
CPC ...... G06F 3/0659; G06F 3/061; G06F 3/0671; G06F 13/28; G06F 9/3853; G06F 13/1642; G06G 13/14
See application file for complete search history.

(56) References Cited

U.S. PATENT DOCUMENTS 8,055,816 B2 11/2011 Asnaashari et al.
8,260,973 B2 9/2012 Asnaashari et al.
(Continued)

FOREIGN PATENT DOCUMENTS

CN 101211257 A 7/2008
CN 102541769 A 7/2012
(Continued)

OTHER PUBLICATIONS

International Search Report of Application No. PCT/CN2022/090331 dated Aug. 23, 2022 with English translation, (7p).
(Continued)

*Primary Examiner* — Idriss N Alrobaye
*Assistant Examiner* — Richard B Franklin
(74) *Attorney, Agent, or Firm* — Arch & Lake LLP

(57) ABSTRACT

Provided in the present disclosure are a data access method and apparatus, and a non-transient computer-readable storage medium. The method includes: acquiring a plurality of instructions to be processed, wherein each of the instructions to be processed includes an address to be accessed; determining instructions to be merged from among the plurality of instructions to be processed, and performing merging processing on the instructions to be merged, so as to obtain a merged instruction; and performing data access according to an address to be accessed corresponding to the merged instruction.

16 Claims, 4 Drawing Sheets

(56) References Cited

U.S. PATENT DOCUMENTS

| | | | |
|---|---|---|---|
| 8,396,995 B2 | 3/2013 | Asnaashari et al. | |
| 8,751,700 B2 | 6/2014 | Asnaashari et al. | |
| 9,015,356 B2 | 4/2015 | Asnaashari et al. | |
| 9,898,206 B2 * | 2/2018 | Fan | G06F 3/0656 |
| 10,331,351 B2 | 6/2019 | Asnaashari et al. | |
| 10,949,091 B2 | 3/2021 | Asnaashari et al. | |
| 11,010,100 B1 | 5/2021 | Gray et al. | |
| 2010/0180086 A1 | 7/2010 | Allen et al. | |
| 2010/0262721 A1 | 10/2010 | Asnaashari et al. | |
| 2012/0011335 A1 | 1/2012 | Asnaashari et al. | |
| 2012/0324180 A1 | 12/2012 | Asnaashari et al. | |
| 2013/0268701 A1 | 10/2013 | Asnaashari et al. | |
| 2014/0310431 A1 | 10/2014 | Asnaashari et al. | |
| 2015/0169359 A1 | 6/2015 | Busaba et al. | |
| 2015/0212734 A1 | 7/2015 | Asnaashari et al. | |
| 2015/0220275 A1 | 8/2015 | Oh et al. | |
| 2015/0253995 A1 | 9/2015 | Zhao et al. | |
| 2016/0098349 A1 | 4/2016 | Watahiki | |
| 2016/0154590 A1 | 6/2016 | Fan et al. | |
| 2019/0265889 A1 | 8/2019 | Asnaashari et al. | |
| 2020/0081654 A1 | 3/2020 | Chan et al. | |
| 2020/0371696 A1 | 11/2020 | Li et al. | |

FOREIGN PATENT DOCUMENTS

| | | | |
|---|---|---|---|
| CN | 102439576 A | 4/2015 |
| CN | 105739919 A | 7/2016 |
| CN | 110187835 A | 8/2019 |
| CN | 110688155 A | 1/2020 |
| JP | H0991098 A | 4/1997 |
| JP | H11345153 A | 12/1999 |
| JP | 2015060486 A | 3/2015 |
| JP | 2020194524 A | 12/2020 |

OTHER PUBLICATIONS

CSDN blogger "Kernel Craftsman", "Multi-queue architecture analysis" dated on May 8, 2020 with English translation, (27p).

Jedec Standard, Universal Flash Storage(UFS), Version 4.0(JESD220F), dated on Aug. 2022, (489p).

Jedec Standard, Universal Flash Storage Host Controller Interface (UFSHCI), Version 4.0(JESD223E), dated on Aug. 2022, (114p).

The First Office Action issued in JP Application No. 2023-576158 dated Dec. 18, 2024 with English translation, (18p).

CNOA issued in Application No. 202111543913.4 dated Sep. 8, 2025 with English translation, (9p).

Extended European Search Report of EP Application No. 22905757.5 dated Oct. 24, 2025, (9p).

* cited by examiner

| address 1 | address 2 | address 3 | address 4 | address 5 | address 6 |
|---|---|---|---|---|---|
| 1 | 2 | 3 | 4 | 5 | 6 |

Positions of file 1 in the memory are 1 to 6

FIG. 1

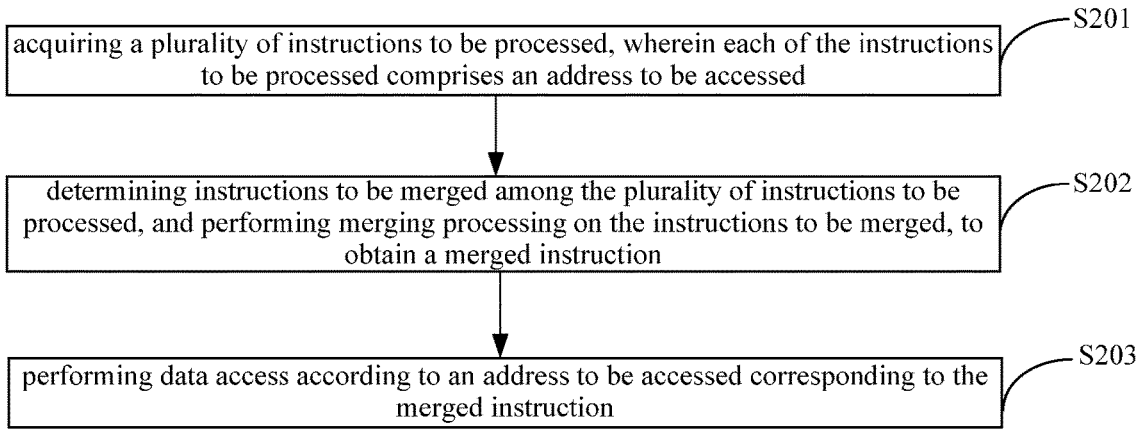

acquiring a plurality of instructions to be processed, wherein each of the instructions to be processed comprises an address to be accessed — S201 determining instructions to be merged among the plurality of instructions to be processed, and performing merging processing on the instructions to be merged, to obtain a merged instruction — S202 performing data access according to an address to be accessed corresponding to the merged instruction — S203

FIG. 2

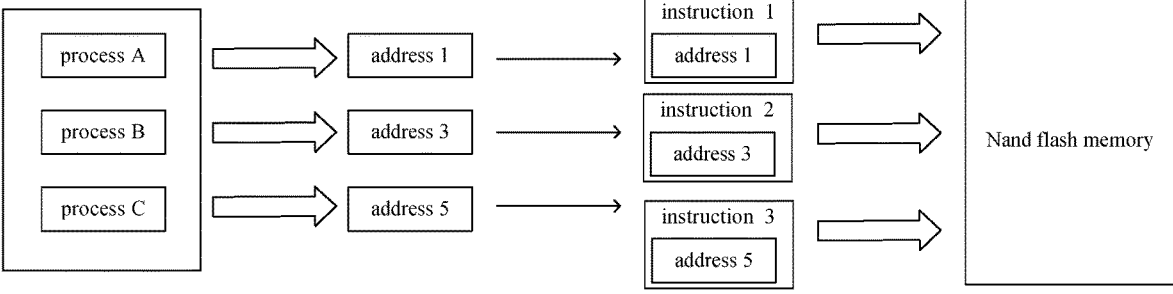

FIG. 3

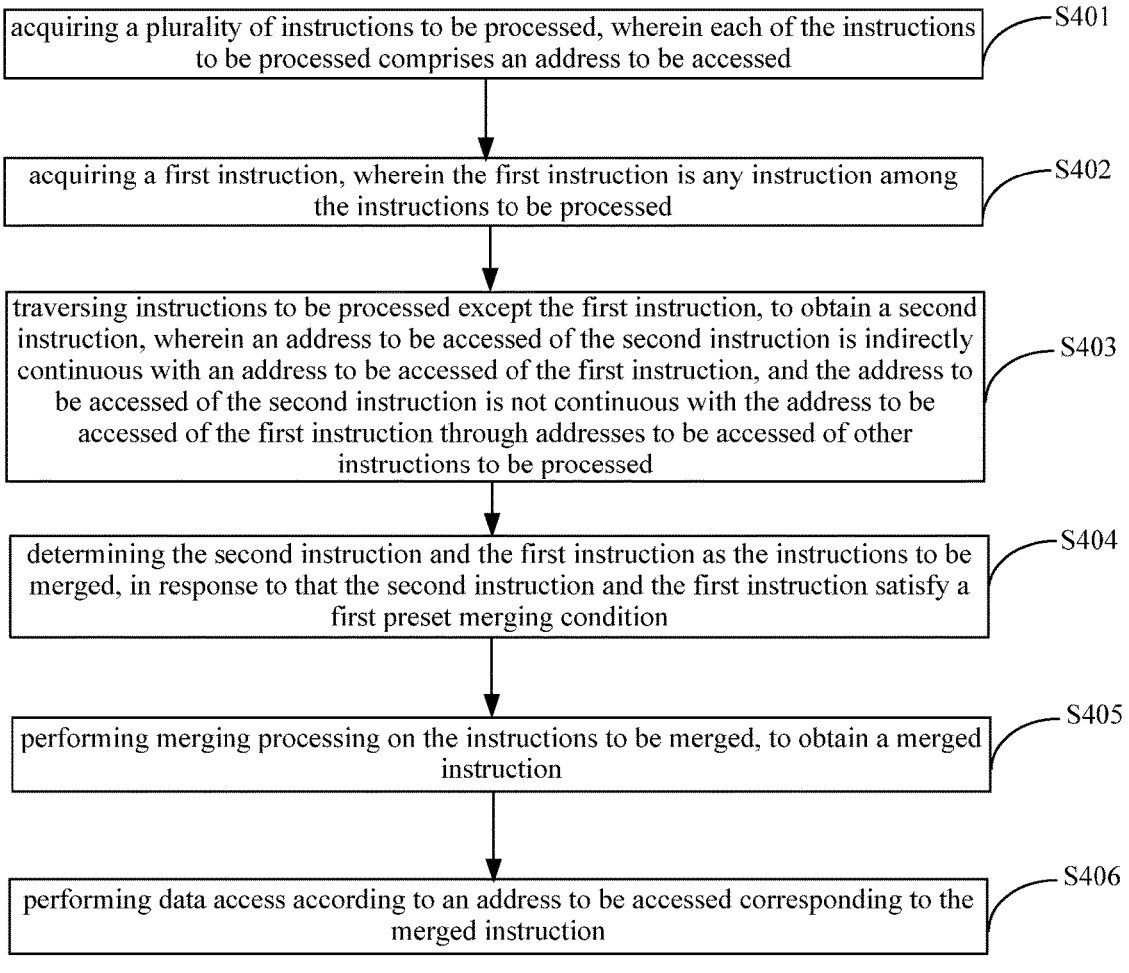

acquiring a plurality of instructions to be processed, wherein each of the instructions to be processed comprises an address to be accessed — S401 acquiring a first instruction, wherein the first instruction is any instruction among the instructions to be processed — S402 traversing instructions to be processed except the first instruction, to obtain a second instruction, wherein an address to be accessed of the second instruction is indirectly continuous with an address to be accessed of the first instruction, and the address to be accessed of the second instruction is not continuous with the address to be accessed of the first instruction through addresses to be accessed of other instructions to be processed — S403 determining the second instruction and the first instruction as the instructions to be merged, in response to that the second instruction and the first instruction satisfy a first preset merging condition — S404 performing merging processing on the instructions to be merged, to obtain a merged instruction — S405 performing data access according to an address to be accessed corresponding to the merged instruction — S406

FIG. 4

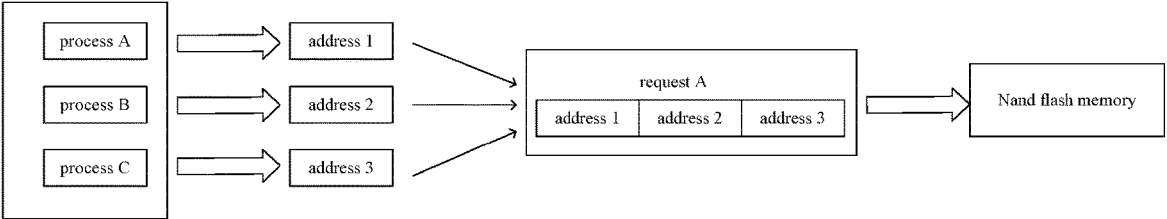

FIG. 5

METHOD AND APPARATUS FOR MERGING INSTRUCTIONS TO BE PROCESSED, AND NON-TRANSIENT COMPUTER-READABLE STORAGE MEDIUM

The present application is a U.S. National Stage of International Application No. PCT/CN2022/090331, filed on Apr. 29, 2022, which is based on and claims the benefit of priority to Chinese Application No. 202111543913.4, filed on Dec. 16, 2021, the entire disclosures of which are incorporated by reference herein for all purposes.

TECHNICAL FIELD

The present disclosure relates to the technical field of electronic device, and in particular, to a data access method, apparatus and non-transient computer-readable storage medium.

BACKGROUND

With the development of technology, memories (for example, Nand flash) based on the Joint Electron Device Engineering Council (JEDEC) protocol are widely used in electronic devices such as mobile terminals.

Currently, after a process on an electronic device generates an instruction to be processed, the instruction to be processed is sent to a memory based on the JEDEC protocol. The memory processes the instruction to be processed, that is, accesses the address to be accessed of the instruction to be processed, i.e., data reading and writing.

SUMMARY

In view of this, the present disclosure provides a data access method, apparatus and non-transient computer-readable storage medium.

According to a first aspect of an embodiment of the present disclosure, there is provided a data access method, applied to an electronic device, and the method including:

acquiring a plurality of instructions to be processed, wherein each of the instructions to be processed includes an address to be accessed;

determining instructions to be merged among the plurality of instructions to be processed, and performing merging processing on the instructions to be merged, to obtain a merged instruction; and performing data access according to an address to be accessed corresponding to the merged instruction.

According to a second aspect of an embodiment of the present disclosure, there is provided a data access apparatus, applied to an electronic device, and the apparatus including:

an instruction acquisition module, configured to acquire a plurality of instructions to be processed, wherein each of the instructions to be processed includes an address to be accessed;

an instruction merging module, configured to determine instructions to be merged among the plurality of instructions to be processed, and perform merging processing on the instructions to be merged, to obtain a merged instruction; and an instruction sending module, configured to perform data access according to an address to be accessed corresponding to the merged instruction.

According to a third aspect of an embodiment of the present disclosure, there is provided a non-transient computer-readable storage medium, having a computer program stored thereon, wherein the program implements steps of any of the data access method according to the first aspect when executed by a processor.

According to a fourth aspect of an embodiment of the present disclosure, there is provided a data access apparatus, including:

at least one processor; and a memory configured to store instructions executable by the at least one processor, wherein the at least one processor is configured to:

acquire a plurality of instructions to be processed, wherein each of the instructions to be processed includes an address to be accessed;

determine instructions to be merged among the plurality of instructions to be processed, and perform merging processing on the instructions to be merged, to obtain a merged instruction; and perform data access according to an address to be accessed corresponding to the merged instruction.

According to a fifth aspect of an embodiment of the present disclosure, there is provided a computer program product, including a computer program, wherein the program implements steps of any of the data access method according to the first aspect when executed by a processor.

It should be understood that the foregoing general description and the following detailed description are exemplary and explanatory only, and do not limit the present disclosure.

BRIEF DESCRIPTION OF THE DRAWINGS

The accompanying drawings, which are incorporated in and constitute a part of this specification, illustrate embodiments consistent with the disclosure and together with the description, serve to explain the principles of the disclosure.

FIG. 1 is a schematic diagram of the location layout of a file according to an example embodiment of the present disclosure;

FIG. 2 is a flow chart of a data access method according to an example embodiment of the present disclosure;

FIG. 3 is a schematic diagram of a sequential reading and writing process according to an example embodiment of the present disclosure;

FIG. 4 is a flow chart of a data access method according to another example embodiment of the present disclosure;

FIG. 5 is a schematic diagram of a random reading and writing process according to an example embodiment of the present disclosure;

DETAILED DESCRIPTION

Figure 6:
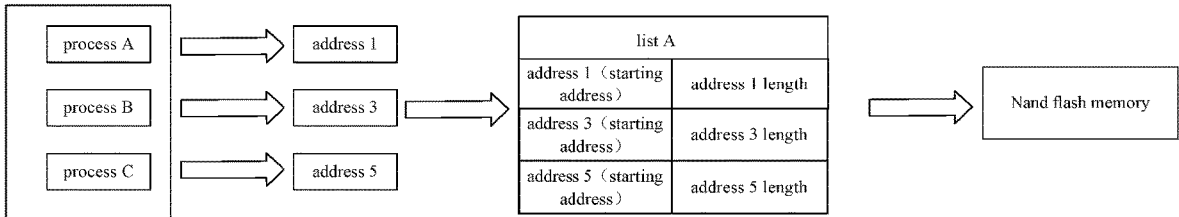
FIG. 6 is a schematic diagram of a random reading and writing process according to another example embodiment of the present disclosure.

Example embodiments will be described in detail herein, examples of which are illustrated in the accompanying drawings. When the following description refers to the drawings, the same numbers in different drawings refer to the same or similar elements unless otherwise indicated. The implementations described in the following example embodiments do not represent all implementations consistent with the present disclosure. Rather, they are merely examples of apparatus and methods consistent with aspects of the disclosure as detailed in the appended claims.

The terminology used in this disclosure is for the purpose of describing particular embodiments only and is not intended to limit the disclosure. As used in this disclosure and the appended claims, the singular forms "a," "the" and "said" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used in this disclosure to describe various information, the information should not be limited to these terms. These terms are only used to distinguish information of the same type from each other. For example, without departing from the scope of the present disclosure, the first information may also be called second information, and similarly, the second information may also be called first information. Depending on the context, the word "if" as used herein may be interpreted as "when . . . " or "at the time of . . . " or "in response to determining . . . ".

In the related art, an instruction to be processed generated by a process on an electronic device is acquired, and the instruction to be processed is sent to a memory based on the JEDEC protocol. The memory processes the instruction to be processed, that is, accesses the address to be accessed of the instruction to be processed.

As for the memory based on the JEDEC protocol, the memory chip is accessed in units of blocks. As shown in FIG. 1, the storage unit of data in the file system (for example, F2FS (Flash Friendly File System)) of the electronic device is 4 KB, and the size of file 1 is 24 KB. The data of file 1 can be placed in positions LBA1 to LBA6 respectively, addresses 1 to 6.

Optionally, Nand flash memory based on the JEDEC protocol includes EMMC (Embedded Multi Media Card) memory chips, and UFS (Universal Flash Storage) memory chips.

However, when the number of instructions to be processed is plural, the instructions to be processed need to be sent to the memory based on the JEDEC protocol one by one, resulting in an increase in instruction overhead, that is, the resources required to send related instructions to the memory are increased. The memory based on the JEDEC protocol can only process instructions to be processed one by one, which reduces the efficiency of instruction processing and thus affecting performance of the electronic device.

Therefore, aiming at the above problems, an embodiment of the present disclosure proposes a data access method. This method merges the instructions to be processed after acquiring the plurality of instructions to be processed, to obtain a merged instruction. The merged instruction includes the addresses to be accessed of the plurality of instructions to be processed. The merged instruction is sent to the memory based on the JEDEC protocol, to reduce the instruction overhead. The memory based on the JEDEC protocol accesses based on a plurality of addresses to be accessed in the merged instruction, realizing concurrent processing of the instructions to be processed, improving the efficiency of instruction processing, thereby improving the performance of the electronic device, i.e., improving the overall system IO (Input/Output) performance.

As shown in FIG. 2, FIG. 2 is a flow chart of a data access method according to an example embodiment of the present disclosure. The method is applied to an electronic device.

Specifically, the method is applied to a processor of an electronic device. The method includes following steps.

S201, a plurality of instructions to be processed are acquired, wherein each of the instructions to be processed includes an address to be accessed.

S202, instructions to be merged among the plurality of instructions to be processed are determined, and merging processing is performed on the instructions to be merged, to obtain a merged instruction.

In the embodiment of the present disclosure, the electronic device supports multi-task parallel processing. During operation, each process of the electronic device will simultaneously generate various data reading and writing operation requests, i.e., instructions to be processed. After acquiring the instructions to be processed generated by the process, i.e., a plurality of instructions to be processed, the instructions to be processed that can be merged are determined from the plurality of instructions to be processed. That is, at least two instructions to be processed are regarded as the instructions to be merged, and the merging processing is performed on the instructions to be merged. That is, the plurality of instructions are merged into one instruction, and the instruction obtained through merging is used as a merged instruction. The merged instruction includes a plurality of addresses to be accessed, and the plurality of addresses to be accessed include the addresses to be accessed of respective instructions to be merged.

The instructions to be processed include addresses to be accessed, that is, each instruction to be processed has a corresponding address to be accessed. The address to be accessed represents the data address that needs to be accessed, that is, the address where data reading and writing are needed.

Optionally, the address to be accessed is a logical address.

S203, data access is performed according to an address to be accessed corresponding to the merged instruction.

In this embodiment, data access is performed based on the address to be accessed of each instruction to be merged in the merged instruction. That is, the address to be accessed of each instruction to be merged in the merged instruction is accessed, to perform corresponding data reading and writing operation, so that the addresses to be accessed of the plurality of instructions to be processed may be accessed by using a single instruction, without requiring to access the plurality of addresses to be accessed based on the plurality of instructions, which realizes concurrent processing of instructions and improves the efficiency of data access.

Optionally, when data access is performed based on the merged instruction, the memory can be used for data access. That is, the merged instruction is sent to the target memory, so that the target memory performs data access based on the addresses to be accessed of respective instructions to be merged in the merged instruction.

Specifically, after obtaining the merged instruction, the merged instruction is sent to the target memory. The target memory executes the merged instruction, i.e., parses the merged instruction, obtains a plurality of addresses to be accessed in the merged instruction, and accesses the plurality of addresses to be accessed in the merged instruction, to perform corresponding data reading and writing operation, to improve the efficiency of instruction processing, make full use of the concurrent processing capability of the target memory, and improve the concurrency of the target memory.

The target memory includes the memory based on JEDEC protocol, for example, Nand flash. Specifically, the target memory is an EMMC (Embedded Multi Media Card) memory chip, a UFS (Universal Flash Storage) memory chip, etc.

Optionally, the electronic device includes a mobile terminal (for example, mobile phone, tablet, etc.), a terminal device (for example, computer, server) and other products including the target memory.

It can be understood that the access manner of the target memory includes random access (i.e., random reading and writing). The random reading and writing refer to discrete and random address access to the memory. Taking the target memory as Nand flash memory as an example, after obtaining the instructions to be processed generated by the process, the instructions to be processed are cached. When the addresses to be accessed of the cached instructions to be processed are not adjacent consecutive addresses, it indicates that random access is required for access, and the multi-command mode is used. That is, the instructions to be processed are sent to the Nand flash memory respectively, i.e., the Nand flash memory is accessed respectively, which increases the instruction overhead. Besides, the Nand flash memory can only process one instruction to be processed at one time, which cannot fully utilize the concurrent processing capability of the Nand flash memory and affects the throughput of random access of the system. For example, as shown in FIG. 3, process A generates instruction 1, and the address to be accessed in instruction 1 is address 1 (that is, address 1 in FIG. 1). Process B generates instruction 2, and the address to be accessed in instruction 2 is address 3 (that is, address 3 in FIG. 1). Process C generates instruction 3, and the address to be accessed in instruction 3 is address 5 (that is, address 5 in FIG. 1). Processes A, B, and C access data of logical addresses 1, 3, and 5 of file 1 in FIG. 1. Since address 1, address 3 and address 5 are not consecutive, they cannot be merged, and instruction 1, instruction 2 and instruction 3 can only be sent to the Nand flash memory respectively. In this disclosure, the instructions to be processed with discontinuous addresses to be accessed are merged, that is, a plurality of instructions to be processed are merged to obtain one instruction, i.e., obtain the merged instruction, thereby reducing the instruction overhead. The merged instruction is sent to the Nand flash memory, so that the Nand flash memory can access the plurality of addresses to be accessed at one time, thereby improving the efficiency of instruction processing.

It can be seen from the above description that, when a plurality of instructions to be processed are obtained, the instructions to be merged among the plurality of instructions to be processed are determined. That is, at least two instructions to be processed that can be merged are determined, and the determined instructions to be merged are merged, to obtain the merged instruction, which reduces the number of instructions, and thereby reduces the instruction overhead. Data access is performed based on the address to be accessed corresponding to the merged instruction, so that the addresses to be accessed of the plurality of instructions to be processed can be accessed based on one instruction, and concurrent processing of instructions is realized, which improves the efficiency of instruction processing, thereby effectively improving performance of the electronic device.

As shown in FIG. 4, FIG. 4 is a flow chart of a data access method according to another example embodiment of the present disclosure. Based on the embodiment of FIG. 2, in the case of random access, instructions with non-consecutive addresses to be accessed can be merged. This process will be described below with reference to a specific embodiment. As shown in FIG. 4, the method includes following steps.

S401, a plurality of instructions to be processed are acquired, wherein each of the instructions to be processed includes an address to be accessed.

S402, a first instruction is acquired, wherein the first instruction is any instruction among the instructions to be processed.

In the embodiment of the present disclosure, one instruction to be processed is selected from the acquired instructions to be processed, and the selected instruction to be processed is used as the first instruction.

Optionally, in order to improve the efficiency of data access, after obtaining the instructions to be processed, the instructions to be processed can be saved in a preset instruction queue, to cache the instructions, thereby facilitating the merging of the instructions to be processed. One instruction to be processed is selected from the preset instruction queue that stores the instructions to be processed as the first instruction, that is, the first instruction is determined. The process of determining the first instruction is as follows: saving the instructions to be processed in a preset instruction queue. An instruction to be processed in the preset instruction queue that satisfies at least one of the following conditions is served as the first instruction: a second duration corresponding to the instruction to be processed is greater than a second time threshold. The second duration indicates a saved duration of the instruction to be processed in the preset instruction queue. The instruction to be processed is at a set position in the preset instruction queue, the set position is a head position or a tail position.

The instructions to be processed in the preset instruction queue may be arranged based on the preset address sorting rule. The preset address sorting rule includes an address sorting rule from large to small (i.e., the addresses to be accessed of the instructions to be accessed in the preset instruction queue are arranged from large to small), an address sorting rule from small to large (i.e., the addresses to be accessed of the instructions to be accessed in the preset instruction queue are arranged from small to large), etc.

Optionally, when there are a plurality of instructions to be processed that satisfy the condition, the instruction to be processed with the longest second duration can be served as the first instruction, and the second duration indicates a saved duration of the instruction to be processed in the preset instruction queue. The logical addresses are named in order. For example, if there are 1000 storage blocks in the target memory, the 1000 storage blocks are named according to 1-1000. Correspondingly, the logical addresses are 1-1000. Since the address to be accessed is a logical address, the addresses to be accessed can be sorted according to the size of the address to be accessed, so that the instructions to be processed can be sorted based on the order of the addresses to be accessed.

Optionally, the set position can also be other position, which is not limited herein.

Optionally, the condition for determining the first instruction from the preset instruction queue may also include other conditions, for example, the instruction to be processed has the longest second duration. That is, the instruction to be processed that has been stored in the preset instruction queue for the longest time can be used as the first instruction.

Optionally, after obtaining the instructions to be processed, relevant processing (for example, determining whether the instruction format is standardized, whether the memory is free, etc.) can be performed on the instructions to be processed first, and the processed instructions to be processed is saved in the preset instruction queue.

S403, instructions to be processed except the first instruction are traversed, to obtain a second instruction, wherein an address to be accessed of the second instruction is indirectly continuous with an address to be accessed of the first instruction, and the address to be accessed of the second instruction is not continuous with the address to be accessed of the first instruction through addresses to be accessed of other instructions to be processed.

In the embodiment of the present disclosure, the instructions to be processed except the first instruction in the preset instruction queue are traversed, to determine whether there is a second instruction with a non-consecutive address corresponding to the first instruction in the other instructions to be processed, so as to determine the instructions to be merged based on the second instruction when it is determined that the second instruction exists. That is, the first instruction and the second instruction are determined as the instructions to be merged. For example, the first instruction is an instruction at the head of the preset instruction queue, and instructions at other positions in the preset instruction queue are traversed, to determine whether instructions at other positions in the preset instruction queue include the second instruction.

The address to be accessed of the second instruction is indirectly continuous with an address to be accessed of the first instruction, and the address to be accessed of the second instruction is not continuous with the address to be accessed of the first instruction through addresses to be accessed of other instructions to be processed.

The indirect continuity indicates that the address to be accessed of the second instruction is continuous with the address to be accessed of the first instruction through other logical addresses, that is, the address to be accessed of the second instruction is not continuous with the address to be accessed of the first instruction. For example, the address to be accessed of the currently traversed instruction to be processed is 4, and the address to be accessed of the first instruction is 1, the address to be accessed of the currently traversed instruction to be processed needs to be continuous with the address to be accessed of the first instruction through other logical addresses (i.e., logical addresses 2 and 3), then it is determined that the address to be accessed of the currently traversed instruction to be processed and the address to be accessed of the first instruction are indirectly continuous.

If the address to be accessed of the currently traversed instruction to be processed is 2, and the address to be accessed of the first instruction is 1, it is determined that the address to be accessed of the currently traversed instruction to be processed is continuous with the address to be accessed of the first instruction.

In the embodiment of the present disclosure, during the process of traversing the instructions to be processed except the first instruction, it is determined whether the address to be accessed of the currently traversed instruction to be processed and the address to be accessed of the first instruction are indirectly continuous. If the address to be accessed of the currently traversed instruction to be processed is not indirectly continuous with the address to be accessed of the first instruction, it indicates that the address to be accessed of the currently traversed instruction to be processed is continuous with the address to be accessed of the first instruction, then it is determined that the currently traversed instruction to be processed is the sequential access instruction corresponding to the first instruction, i.e., not the second instruction. If the address to be accessed of the currently traversed instruction to be processed is indirectly continuous with the address to be accessed of the first instruction, it is determined whether the address to be accessed of the currently traversed instruction to be processed is continuous with the address to be accessed of the first instruction through addresses to be accessed of other instructions to be processed. If the address to be accessed of the currently traversed instruction to be processed is continuous with the address to be accessed of the first instruction through addresses to be accessed of other instructions to be processed, it is determined that the currently traversed instruction to be processed is not the second instruction. If the address to be accessed of the currently traversed instruction to be processed is not continuous with the address to be accessed of the first instruction through addresses to be accessed of other instructions to be processed, it is determined that the currently traversed instruction to be processed is the second instruction. For example, the instructions to be processed include instruction 1, instruction 2 and instruction 3. The address to be accessed of instruction 1 is 1, the address to be accessed of instruction 2 is 2, and the address to be accessed of instruction 3 is 3. Instruction 3 is the currently traversed instruction to be processed, and instruction 1 is the first instruction. It is determined that the address to be accessed of instruction 3 is not continuous, i.e., indirect continuous, with the address to be accessed of instruction 1. Continue to determine whether the address to be accessed of instruction 3 is continuous with the address to be accessed of instruction 1 through addresses to be accessed of other instructions to be processed. Since the address to be accessed of instruction 3 is continuous with the address to be accessed of instruction 1 through the address to be accessed of instruction 2, it is determined that instruction 3 is not the second instruction.

Optionally, when the instructions to be processed are arranged based on the preset address sorting rule, during the process of traversing the instructions to be processed except the first instruction, it is determined whether the address to be accessed of the currently traversed instruction to be processed is continuous with the address to be accessed of the first instruction. If the address to be accessed of the currently traversed instruction to be processed is continuous with the address to be accessed of the first instruction, it is determined that the currently traversed instruction to be processed is the sequential access instruction corresponding to the first instruction, that is, not the second instruction. If the address to be accessed of the currently traversed instruction to be processed is not continuous with the address to be accessed of the first instruction, it is continued to determine whether the address to be accessed corresponding to the currently traversed instruction to be processed is continuous with the address to be accessed of the previously traversed instruction to be processed. If the address to be accessed corresponding to the currently traversed instruction to be processed is continuous with the address to be accessed of the previously traversed instruction to be processed, it is determined that the currently traversed instruction to be processed is the sequential access data instruction corresponding to the first instruction, that is, not the second instruction, in a case that the address to be accessed of the previously traversed instruction to be processed is continuous with the address to be accessed of the first instruction or continuous with the address to be accessed of the first instruction through the addresses to be accessed of the traversed instructions to be processed. If the address to be accessed corresponding to the currently traversed instruction to be processed is not continuous with the address to be accessed of the previously traversed instruction to be processed, it is determined that the currently traversed instruction to be processed is the second instruction.

Optionally, the corresponding access manner of the target memory also includes sequential access (i.e., sequential reading and writing). The sequential access refers to continuous address access to the memory, and the random reading and writing refer to discrete random address access to the memory. When it is determined that none of the instructions to be processed except the first instruction in the preset instruction queue is the second instruction, it is indicated that the other instructions to be processed are all sequential access instructions of the first instruction. That is, it is indicated that the addresses to be accessed of the other instructions to be processed and the address to be accessed of the first instruction can be accessed sequentially, then the first instruction and the instruction to be processed whose address to be accessed is consecutive with the address to be accessed of the first instruction can be used as instructions to be merged according to the sequential access rule. The merging processing is performed on instructions to be merged to obtain the merged instruction. Data access is performed based on the addresses to be accessed of each instruction to be merged in the merged instruction.

The sequential access rule can be defined according to actual needs, for example, all or part of the instructions to be processed except the first instruction are used as instructions to be merged.

Specifically, in order to improve the efficiency of data reading and writing access, the instructions to be processed generated by each process can be cached. Taking the target memory as Nand flash memory as an example, when the addresses to be assessed of the cached instructions to be processed are adjacent consecutive addresses, it indicates that the sequential access manner can be used for access. The consecutive adjacent addresses, that is, the instructions to be processed can be merged, so that the Nand flash memory can be accessed sequentially based on the merged instruction to be processed, i.e., the merged address, thereby using a small number of instructions to the greatest extent, and ensuring that the addresses accessed by each instruction and the previous and subsequent instructions are continuous, the concurrency of memory processing data is improved and instruction overhead is reduced. For example, as shown in FIG. 5, process A generates instruction 1, and the address to be accessed in instruction 1 is address 1 (that is, address 1 in FIG. 1), and process B generates instruction 2, and the address to be accessed in instruction 2 is address 2 (that is, address 2 in FIG. 1), process C generates instruction 3, and the address to be accessed in instruction 3 is address 3 (that is, address 3 in FIG. 1). Processes A, B, and C access data of logical addresses 1, 2, and 3 of file 1 in FIG. 1. Since address 1, address 2 and address 3 are adjacent and continuous, instructions 1, 2 and 3 can be merged, to obtain an instruction including address 1, address 2 and address 3, that is, request A. The request A is sent to the Nand flash memory, so that the Nand flash memory can be accessed sequentially based on request A.

S404, in response to that the second instruction and the first instruction satisfy a first preset merging condition, the second instruction and the first instruction are determined as the instructions to be merged.

In the embodiment of the present disclosure, when it is determined that the currently traversed instruction to be processed is the second instruction, it is continued to determine whether the second instruction is an instruction to be merged, that is, it is determined whether the second instruction and the first instruction satisfy the first preset merging condition. When the second instruction and the first instruction satisfy the first preset merging condition, it indicates that the second instruction, i.e., the currently traversed instruction to be processed, can be merged with the first instruction, that is, concurrent access can be performed, then the second instruction and the first instruction are used as instructions to be merged, and it is continued to traverse the instructions to be processed except the first instruction, that is, the next instruction to be processed except the first instruction is traversed, to determine whether the next instruction to be processed is the second instruction.

In response to that the second instruction and the first instruction do not satisfy the first preset merging condition, it is continued to traverse the instructions to be processed except the first instruction, to determine whether the next instruction to be processed is the second instruction.

Optionally, in a case of continuing to traverse instructions to be processed except the first instruction, it is necessary to firstly determine whether the cache time of the first instruction exceeds the time that the first instruction can wait for execution, that is, acquire the first duration, and acquire the first time threshold corresponding to the first instruction. The first duration indicates a duration from a moment when it is determined to acquire the first instruction to a current moment. In response to the first duration being less than the first time threshold, it indicates that the time for which the instruction can wait for execution has not exceeded, that is, the time for which the instruction can be cached has not exceeded, it is continued to traverse the instructions to be processed except the first instruction. In response to the first duration being greater than or equal to the first time threshold, it indicates that the time for which the instruction can be cached has been exceeded, that is, the time for which the instruction can wait for execution has been exceeded, then the traversal of instructions to be processed except the first instruction is stopped, and then the determined instructions to be merged in the traversal process are merged.

The first time threshold indicates the upper limit of instruction execution waiting time. The first time threshold can be set based on the real-time requirements of the relevant application corresponding to the process. It represents the upper limit of the instruction execution waiting time, that is, it indicates the maximum time that the instruction can be cached.

Specifically, since different processes have different real-time requirements, the first time threshold can be determined according to the process corresponding to the first instruction. That is, in the case of acquiring the first time threshold corresponding to the first instruction, the target process corresponding to the first instruction can be acquired, that is, the process of the first instruction is generated, and the process type (for example, video application type, notepad application type) corresponding to the target process is determined. The time threshold corresponding to the process type is used as the first time threshold corresponding to the first instruction.

Optionally, determining the second instruction and the first instruction as the instructions to be merged, in response to that the second instruction and the first instruction satisfy a first preset merging condition includes:

acquiring a storage interval, and/or acquiring a total amount of currently accessed data, wherein the storage interval indicates a distance between the address to be accessed of the first instruction and the address to be accessed of the second instruction, the total amount of currently accessed data indicates a sum of amounts of data to be accessed corresponding to all instructions to be merged;

determining the second instruction and the first instruction as the instructions to be merged, in a case that the storage interval is less than a first preset threshold, and/or the total amount of currently accessed data is less than a second preset threshold.

For example, the first preset merging condition includes that the storage interval is less than a first preset threshold. The storage interval is acquired. It is determined whether the storage interval is less than the first preset threshold. In response to the storage interval being less than the first preset threshold, it indicates that the currently traversed instruction to be processed can be accessed concurrently, that is, it is determined that the second instruction and the first instruction are instructions to be merged. In response to the storage interval being greater than or equal to the first preset threshold, it indicates that the currently traversed instruction to be processed cannot be concurrently accessed, it is determined that the second instruction is not an instruction to be merged and cannot be merged with the first instruction.

For example, the first preset merging condition is that the total amount of currently accessed data is less than a second preset threshold, the total amount of currently accessed data is acquired. It is determined whether the total amount of currently accessed data is less than the second preset threshold. In response to that the total amount of currently accessed data is less than the second preset threshold, it indicates that the currently traversed instruction to be processed can be accessed concurrently, it is determined that the second instruction and the first instruction are instructions to be merged. In response to that the total amount of currently accessed data is greater than or equal to the second preset threshold, it indicates that the currently traversed instruction to be processed cannot be concurrently accessed, it is determined that the second instruction is not an instruction to be merged.

For example, the first preset merging condition includes that the storage interval is less than the first preset threshold and the total amount of currently accessed data is less than the second preset threshold, the storage interval and the total amount of currently accessed data are acquired. It is determined whether the storage interval is less than the first preset threshold, and it is determined whether the total amount of currently accessed data is less than the second preset threshold. In response to that the storage interval is less than the first preset threshold and the total amount of currently accessed data is less than the second preset threshold, it indicates that the currently traversed instruction to be processed can be concurrently accessed, that is, the second instruction is obtained, and it is determined that the second instruction and the first instruction are instructions to be merged. In response to that the storage interval is greater than or equal to the first preset threshold, and/or the total amount of currently accessed data is greater than or equal to the second preset threshold, it indicates that the currently traversed instruction to be processed cannot be concurrently accessed, it is determined that the second instruction is not the instruction to be merged.

The first preset threshold indicates the upper limit of the distance of the merged address, and the merged address represents the difference between the two merged logical addresses. The first preset threshold is determined based on the cache size in the memory, to ensure that the data accessed each time can be processed concurrently by the target memory at one time to the greatest extent. Specifically, the first preset threshold may be provided by the corresponding supplier of the target memory. For example, the first preset threshold is 300M, indicating that the target memory can cache 300M data at a time, so that the corresponding address can be accessed in the cached data.

The second preset threshold indicates the upper limit of the data amount for a single access, that is, the maximum data amount for a single concurrent access. The second preset threshold needs to refer to the hardware support of the target memory, which may be provided by the corresponding supplier of the target memory. For example, the second preset threshold is 128K.

Optionally, before acquiring the storage interval, the storage interval needs to be calculated. The calculation process of the storage interval is as follows: acquiring a difference value between the address to be accessed of the second instruction and the address to be accessed of the first instruction. The address to be accessed is a logical address. The preset storage unit size is acquired. According to the difference value and the preset storage unit size, the product of the difference value and the preset storage unit size is calculated to obtain the storage interval. For example, the address to be accessed of the second instruction is 3, the address to be accessed of the first instruction is 1, and the preset storage unit size is 4 KB, then the storage interval is (3-1)*4 KB=8 KB.

Since the target memory is accessed in units of blocks, that is, storage blocks, the preset storage unit size is the size of the storage block, for example, 4 KB.

Optionally, before acquiring the total amount of currently accessed data, it is necessary to calculate the total amount of currently accessed data. The calculation process of the total amount of currently accessed data is as follows: calculating the sum of amounts of data to be accessed corresponding to the determined respective instructions to be merged (i.e., the first instruction and the second instruction), to obtain the total amount of currently accessed data.

The amount of data to be accessed represents the address length corresponding to the address to be accessed, which can represent the size of the data that needs to be accessed. For example, if data with a size of 24 KB is written starting from the address to be accessed, the 24 KB can be the amount of data to be accessed. The amount of data to be accessed can also represent the address offset, and the amount of data that needs to be accessed can be determined only by the amount of data to be accessed.

The amount of data to be accessed may be acquired from the instruction to be processed, that is, the instruction to be processed includes the amount of data to be accessed, or it may be obtained independently, which is not limited herein.

For example, the first instruction is instruction 1, and the instructions to be processed except the first instruction include instruction 2 and instruction 3, after determining that instruction 2 is the instruction to be merged, it is determined whether instruction 3 is the second instruction. When instruction 3 is the second instruction, the storage interval is calculated and the total amount of currently accessed data is calculated. When the total amount of currently accessed data is calculated, the sum of amounts of data to be accessed corresponding to the determined instructions to be merged is calculated. That is, the sum of the amount of data to be accessed corresponding to instruction 2 and the amount of data to be accessed corresponding to instruction 1 is calculated, and the total amount of currently accessed data is obtained.

Optionally, when the first instruction and the second instruction that satisfy the first preset merging condition are merged, only the first instruction and the second instruction that satisfy the first preset merging condition may be merged, or the sequential access instructions between the first instruction and the second instruction that satisfy the first preset merging condition are merged. Correspondingly, the determined instructions to be merged also include merged sequential access instructions.

For example, the first instruction is instruction 1, the instructions to be processed except the first instruction include instruction 2 and instruction 3, the address to be accessed in instruction 1 is address 1 in FIG. 1, and the address to be accessed in instruction 2 is address 2 in FIG. 1, and the address to be accessed in instruction 3 is address 4 in FIG. 1. The instructions to be processed except the first instruction are traversed, the currently traversed instruction to be processed is instruction 2, it is determined that instruction 2 is the sequential access instruction corresponding to instruction 1, that is, the address to be accessed in instruction 2 is continuous with instruction 1, then the next instruction to be processed, i.e., instruction 3, is traversed, and it is determined that instruction 3 is the second instruction. In the process of calculating the total amount of currently accessed data, since the address to be accessed of instruction 2 is between the address to be accessed of instruction 1 and the address to be accessed of instruction 3, the determined instructions to be merged include instruction 2 and instruction 1, the total amount of currently accessed data is the sum of the amount of data to be accessed corresponding to instruction 2 and the amount of data to be accessed corresponding to instruction 1.

Optionally, when the total amount of currently accessed data is greater than or equal to the second preset threshold, it indicates that the amount of data required to be accessed by the target memory has reached the upper limit when performing a single access based on the determined instructions to be merged. Therefore, there is no need to merge instructions, that is, there is no need to determine the instructions to be merged, and traversal of the instructions to be processed except the first instruction is stopped.

Optionally, when the instructions to be merged are determined from the instructions to be processed, the first instruction can also be acquired. The first instruction is any instruction among the instructions to be processed. The instructions to be processed except the first instruction are traversed. It is determined whether the currently traversed instruction to be processed and the first instruction satisfy the second preset merging condition, and in response to that the currently traversed instruction to be processed and the first instruction satisfy the second preset merging condition, the first instruction and the currently traversed instruction to be processed are determined to be instructions to be merged.

The process of determining whether the first instruction and the currently traversed instruction to be processed satisfy the second preset merging condition is similar to the above process of determining whether the first instruction and the second instruction satisfy the first preset merging condition, which is not elaborated herein.

S405, merging processing is performed on the instructions to be merged, to obtain a merged instruction.

In the embodiment of the present disclosure, a merged processing result is generated according to the address to be accessed of each instruction to be merged, and the merged processing result is encapsulated in a set instruction format, to obtain a merged instruction.

In the embodiment of the present disclosure, after the instructions to be merged are determined, a merged processing result is generated based on the address to be accessed of each instruction to be merged, and the merged processing result includes the address to be accessed of each instruction to be merged. Based on the set instruction format, the merged processing result is encapsulated to obtain a merged instruction, to realize the merging of instructions.

In the process of generating a merged processing result based on the address to be accessed of each instruction to be merged, the merged processing result including the address to be accessed of each instruction to be merged may be generated based on a preset structure type.

The preset structure type includes a linked list structure type, a tree structure type, an array structure type, etc. Users can set them according to actual needs, which is not limited herein.

Optionally, the set instruction format is a format that can be identified by the target memory, for example, the customized Write Buffer command format specified in JDECE.

Optionally, the amount of data to be accessed corresponding to the instructions to be merged can also be saved in the merged processing result, that is, the amount of data to be accessed corresponding to each instruction to be merged is acquired respectively. The amount of data to be accessed corresponding to each instruction to be merged is respectively added to the merged processing result. That is, the merged processing result includes the address to be accessed and the amount of data to be accessed corresponding to the instructions to be merged.

Taking a specific application scenario as an example, as shown in FIG. 6, processes A, B, and C need to access the data in logical addresses 1, 3, and 5 of the file, and then instruction 1, instruction 2, and instruction 3 are generated. The address to be accessed of instruction 1 is address 1, and the amount of data to be accessed corresponding to instruction 1 is the length of address 1. The address to be accessed of instruction 2 is address 3, and the amount of data to be accessed corresponding to instruction 2 is the length of address 3. The address to be accessed of instruction 3 is address 5, and the amount of data to be accessed corresponding to instruction 3 is the length of address 5. The instruction 1 is the first instruction, instruction 2 and instruction 3 are both second instructions, and it is determined that both instruction 2 and instruction 3 are instructions to be merged, then address 1 and the length of address 1 corresponding to instruction 1, address 3 and the length of address 3 corresponding to instruction 2, and address 5 and the length of address 5 corresponding to instruction 3 are added to list A, to realize the merging of instructions.

S406, data access is performed according to an address to be accessed corresponding to the merged instruction.

In this embodiment, after the merged instruction is obtained, the merged instruction is sent to the target memory, so that the target memory performs data access based on the address to be accessed of each instruction to be merged in the merged instruction.

In the embodiment of the present disclosure, in a random reading and writing scenario, that is, when it is determined that a second instruction exists among the instructions to be processed except the first instruction, the first instruction and the second instruction involving discrete access are merged, to obtain the merged instruction, and the merged instruction is stored in the target storage device, which reduces the number of instructions sent to the target memory, thereby reducing the instruction overhead of random reading and writing. Besides, the target memory can be accessed based on a plurality of addresses to be accessed in the merged instruction, so that the concurrency of the target memory is improved, and the throughput of random reading and writing of the system can be improved, that is, the overall IO performance of the system is improved.

In the embodiment of the present disclosure, when it is determined that no second instruction exists among the instructions to be processed except the first instruction, that is, in a sequential reading and writing scenario, the instructions that can be read and written sequentially, that is, the instructions to be processed, are merged, to obtain the merged instruction, and the merged instruction is sent to the target memory, which reduces the number of instructions sent to the target memory, thereby reducing the instruction overhead of sequential reading and writing. Besides, the target memory can be sequentially accessed based on a plurality of addresses to be accessed in the merged instruction, so that the concurrency of processing data by the memory is improved, and the instruction overhead of the system is reduced, and the overall IO performance of the system is effectively improved.

In the embodiment of the present disclosure, after acquiring the instructions to be accessed, the instructions to be accessed are saved in the preset instruction queue, and the instruction to be accessed at the head of the queue in the preset instruction queue is used as the first instruction, and the remaining instructions to be accessed in the preset instruction queue are traversed backward. It is determined whether a second instruction with a discontinuous address to be accessed exists among the remaining instructions to be accessed. If does, it indicates that random access is required, and the second instruction and the first instruction are merged to obtain the corresponding merged instruction, which reduces the number of instructions, thereby reducing the instruction overhead. The merged instruction is stored in the Nand flash memory, so that the Nand flash memory can access each address to be accessed in the merged instruction at a time, realizing concurrent processing of instructions, improving the efficiency of instruction processing, and thus effectively improving the throughput of random access, i.e., improving the overall IO performance of the system.

For the foregoing method embodiments, for the sake of simple description, they are all expressed as a series of action combinations. However, those skilled in the art should know that the present disclosure is not limited by the described action sequence, since some steps may be performed in other orders or simultaneously according to the present disclosure.

Secondly, those skilled in the art should also know that the embodiments described in the specification are all optional embodiments, and the actions and modules involved are not necessarily necessary for the present disclosure.

Corresponding to the foregoing embodiments of application function implementation methods, the present disclosure also provides embodiments of application function implementation apparatuses and corresponding terminals.

Figure 7:
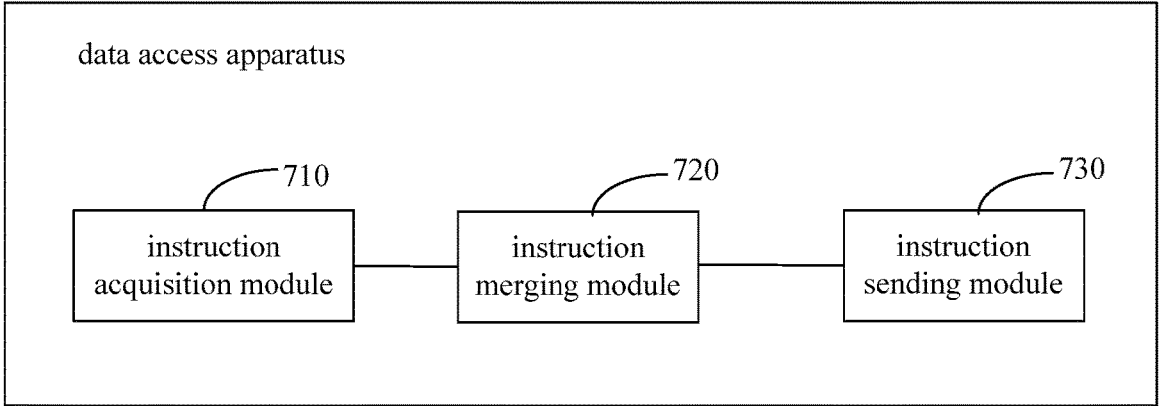
FIG. 7 is a block diagram of a data access apparatus according to an example embodiment of the present disclosure.

Referring to FIG. 7, it is a block diagram of a data access apparatus according to an example embodiment. The apparatus may include:

an instruction acquisition module 710, configured to acquire a plurality of instructions to be processed, wherein each of the instructions to be processed includes an address to be accessed;

an instruction merging module 720, configured to determine instructions to be merged among the plurality of instructions to be processed, and perform merging processing on the instructions to be merged, to obtain a merged instruction; and an instruction sending module 730, configured to perform data access according to an address to be accessed corresponding to the merged instruction.

Optionally, the instruction merging module 720 is configured to:

acquire a first instruction, wherein the first instruction is any instruction among the instructions to be processed;

traverse instructions to be processed except the first instruction, to obtain a second instruction, wherein an address to be accessed of the second instruction is indirectly continuous with an address to be accessed of the first instruction, and the address to be accessed of the second instruction is not continuous with the address to be accessed of the first instruction through addresses to be accessed of other instructions to be processed;

determine the second instruction and the first instruction as the instructions to be merged, in response to that the second instruction and the first instruction satisfy a first preset merging condition.

Optionally, the instruction merging module 720 is further configured to:

acquire a storage interval, and/or acquire a total amount of currently accessed data, wherein the storage interval indicates a distance between the address to be accessed of the first instruction and the address to be accessed of the second instruction, the total amount of currently accessed data indicates a sum of amounts of data to be accessed corresponding to all instructions to be merged;

determine the second instruction and the first instruction as the instructions to be merged, in a case that the storage interval is less than a first preset threshold, and/or the total amount of currently accessed data is less than a second preset threshold.

Optionally, the instruction merging module 720 is further configured to:

acquire a first duration, and acquiring a first time threshold corresponding to the first instruction, wherein the first duration indicates a duration from a moment when it is determined to acquire the first instruction to a current moment;

continue traversing the instructions to be processed except the first instruction, in response to the first duration being less than the first time threshold;

stop traversing the instructions to be processed except the first instruction, in response to the first duration being greater than or equal to the first time threshold.

Optionally, the instruction merging module 720 is further configured to:

stop traversing the instructions to be processed except the first instruction, in a case that the total amount of currently accessed data is greater than or equal to the second preset threshold.

Optionally, the instruction merging module 720 is further configured to:

acquire a difference value between the address to be accessed of the second instruction and the address to be accessed of the first instruction, wherein the address to be accessed is a logical address;

acquire a preset storage unit size;

obtain the storage interval according to the difference value and the preset storage unit size.

Optionally, the instruction merging module 720 is further configured to:

acquire a first instruction, wherein the first instruction is any instruction among the instructions to be processed;

traverse instructions to be processed except the first instruction;

determine a currently traversed instruction to be processed and the first instruction as the instructions to be merged, in response to that the currently traversed instruction to be processed and the first instruction satisfy a second preset merging condition.

Optionally, the instruction merging module 720 is further configured to:

save the instructions to be processed in a preset instruction queue;

serve an instruction to be processed in the preset instruction queue that satisfies at least one of the following conditions as the first instruction:

wherein, a second duration corresponding to the instruction to be processed is greater than a second time threshold, the second duration indicates a saved duration of the instruction to be processed in the preset instruction queue;

the instruction to be processed is at a set position in the preset instruction queue, the set position is a head position or a tail position.

Optionally, the instruction merging module 720 is further configured to:

generate a merged processing result according to addresses to be accessed of respective instructions to be merged, and encapsulating the merged processing result in a set instruction format, to obtain the merged instruction.

Optionally, the instruction merging module 720 is further configured to:

respectively acquire an amount of data to be accessed corresponding to respective instructions to be merged;

respectively add the amount of data to be accessed corresponding to respective instructions to be merged to the merged processing result.

As for the apparatus embodiments, since they basically correspond to the method embodiments, please refer to the description of the method embodiments for relevant details. The apparatus embodiments described above are only illustrative. The units described above as separate components may or may not be physically separated. The components shown as units may or may not be physical units, that is, they may be located in a place, or may be distributed across a plurality of network units. Some or all of the modules can be selected according to actual needs to achieve the purpose of the disclosed solution. Persons of ordinary skill in the art can understand and implement the method without any creative effort.

Correspondingly, on the one hand, embodiments of the present disclosure provide a data access apparatus, including: a processor; and a memory configured to store instructions executable by the processor, wherein the processor is configured to:

acquire a plurality of instructions to be processed, wherein each of the instructions to be processed includes an address to be accessed;

determine instructions to be merged among the plurality of instructions to be processed, and perform merging processing on the instructions to be merged, to obtain a merged instruction; and perform data access according to an address to be accessed corresponding to the merged instruction.

Figure 8:
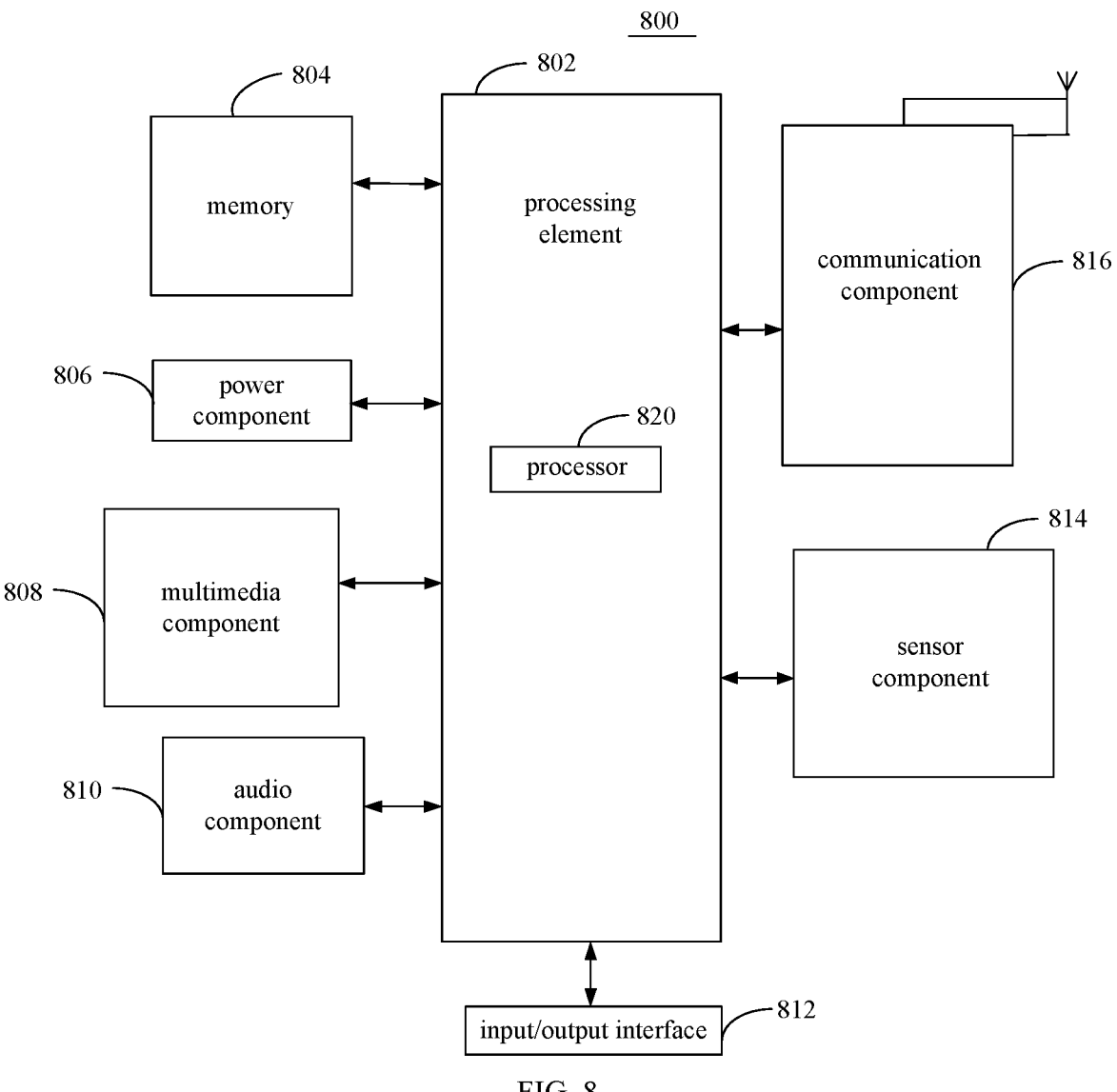
FIG. 8 is a schematic structural diagram of a data access apparatus according to an example embodiment of the present disclosure.

FIG. 8 is a schematic structural diagram of a data access apparatus 800 according to an example embodiment. For example, the apparatus 800 may be an electronic device, which may be a mobile phone, a computer, a digital broadcast terminal, a messaging device, a game console, a tablet device, a medical device, a fitness device, a personal digital assistant, a wearable device such as a smart watch, smart glasses, smart bracelets, smart running shoes, etc.

Referring to FIG. 8, the apparatus 800 may include one or more of the following components: a processing element 802, a memory 804, a power component 806, a multimedia component 808, an audio component 810, an input/output (I/O) interface 812, a sensor component 814, and a communication component 816.

The processing element 802 typically controls the overall operations of the apparatus 800, such as the operations associated with display, telephone calls, data communications, camera operations, and recording operations. The processing element 802 can include one or more processors 820 to execute instructions to perform all or part of the steps in the above described methods. Moreover, the processing element 802 can include one or more modules to facilitate the interaction between the processing element 802 and other components. For example, the processing element 802 can include a multimedia module to facilitate the interaction between the multimedia component 808 and the processing element 802.

The memory 804 is configured to store various types of data to support the operation of the apparatus 800. Examples of such data include instructions for any application or method operated on the apparatus 800, such as the contact data, the phone book data, messages, pictures, videos, and the like. The memory 804 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 can include a power management system, one or more power sources, and other components associated with the generation, management, and distribution of power in the apparatus 800.

The multimedia component 808 includes a screen providing an output interface between the apparatus 800 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. When the apparatus 800 is in an operation mode, such as a photographing mode or a video mode, the front camera and/or the rear camera can receive external multimedia data. Each of the front camera and the rear camera may be a fixed optical lens system or have focus and optical zoom capability.

The audio component 810 is configured to output and/or input an audio signal. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or sent via the communication component 816. In some embodiments, the audio component 810 also includes a speaker for outputting the audio signal.

The I/O interface 812 provides an interface between the processing element 802 and peripheral interface modules, such as a keyboard, a click wheel, buttons, and the like. These buttons may include, but not limited to, a home button, a volume button, a starting button, and a locking button.

The sensor component 814 includes one or more sensors for providing state assessments of various aspects of the apparatus 800. For example, the sensor component 814 can detect an open/closed state of the apparatus 800, relative positioning of components, such as the display and the keypad of the apparatus 800. The sensor component 814 can also detect a change in position of one component of the apparatus 800 or the apparatus 800, the presence or absence of user contact with the apparatus 800, an orientation, or an acceleration/deceleration of the apparatus 800, and a change in temperature of the apparatus 800. The sensor component 814 can also include a proximity sensor configured to detect the presence of nearby objects without any physical contact. The sensor component 814 can also include a light sensor, such as a CMOS or CCD image sensor, configured to use in imaging applications. In some embodiments, the sensor component 814 can also include an accelerometer sensor, a gyroscope sensor, a magnetic sensor, a pressure sensor, or a temperature sensor.

The communication component 816 is configured to facilitate wired or wireless communication between the apparatus 800 and other devices. The apparatus 800 can access a wireless network based on a communication standard, such as WiFi, 2G, 3G, 4G LTE, 5G NR or a combination thereof. In an example embodiment, the communication component 816 receives broadcast signals or broadcast associated information from an external broadcast management system via a broadcast channel. In an example embodiment, the communication component 816 also includes a near field communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In an example embodiment, the apparatus 800 may be implemented with one or more application specific integrated circuits (ASICs), digital signal processors (DSPs), digital signal processing devices (DSPDs), programmable logic devices (PLDs), field programmable Gate arrays (FP-GAs), controllers, microcontrollers, microprocessors or other electronic components, to perform the above methods.

In an example embodiment, a non-transient computer-readable storage medium is also provided, such as memory 804 including instructions that, when executed by the processor 820 of the apparatus 800, enable the apparatus 800 to execute the data access method, which includes:

acquiring a plurality of instructions to be processed, wherein each of the instructions to be processed includes an address to be accessed;

determining instructions to be merged among the plurality of instructions to be processed, and performing merging processing on the instructions to be merged, to obtain a merged instruction; and performing data access according to an address to be accessed corresponding to the merged instruction.

The non-transient computer-readable storage medium may be ROM, random access memory (RAM), CD-ROM, magnetic tape, floppy disk, optical data storage device, etc.

In an example embodiment, a computer program product is also provided, including a computer program that implements the steps of the above method when executed by a processor.

According to a first aspect of an embodiment of the present disclosure, there is provided a data access method, applied to an electronic device, and the method including:

acquiring a plurality of instructions to be processed, wherein each of the instructions to be processed includes an address to be accessed;

determining instructions to be merged among the plurality of instructions to be processed, and performing merging processing on the instructions to be merged, to obtain a merged instruction; and performing data access according to an address to be accessed corresponding to the merged instruction.

Optionally, determining instructions to be merged among the plurality of instructions to be processed includes:

acquiring a first instruction, wherein the first instruction is any instruction among the instructions to be processed;

traversing instructions to be processed except the first instruction, to obtain a second instruction, wherein an address to be accessed of the second instruction is indirectly continuous with an address to be accessed of the first instruction, and the address to be accessed of the second instruction is not continuous with the address to be accessed of the first instruction through addresses to be accessed of other instructions to be processed;

determining the second instruction and the first instruction as the instructions to be merged, in response to that the second instruction and the first instruction satisfy a first preset merging condition.

Optionally, determining the second instruction and the first instruction as the instructions to be merged, in response to that the second instruction and the first instruction satisfy a first preset merging condition includes:

acquiring a storage interval, and/or acquiring a total amount of currently accessed data, wherein the storage interval indicates a distance between the address to be accessed of the first instruction and the address to be accessed of the second instruction, the total amount of currently accessed data indicates a sum of amounts of data to be accessed corresponding to all instructions to be merged;

determining the second instruction and the first instruction as the instructions to be merged, in a case that the storage interval is less than a first preset threshold, and/or the total amount of currently accessed data is less than a second preset threshold.

Optionally, the method further includes:

stopping traversing the instructions to be processed except the first instruction, in a case that the total amount of currently accessed data is greater than or equal to the second preset threshold.

Optionally, the method further includes:

acquiring a first duration, and acquiring a first time threshold corresponding to the first instruction, wherein the first duration indicates a duration from a moment when it is determined to acquire the first instruction to a current moment;

continuing traversing the instructions to be processed except the first instruction, in response to the first duration being less than the first time threshold;

stopping traversing the instructions to be processed except the first instruction, in response to the first duration being greater than or equal to the first time threshold.

Optionally, the method further includes:

acquiring a difference value between the address to be accessed of the second instruction and the address to be accessed of the first instruction, wherein the address to be accessed is a logical address;

acquiring a preset storage unit size;

obtaining the storage interval according to the difference value and the preset storage unit size.

Optionally, the method further includes:

acquiring a first instruction, wherein the first instruction is any instruction among the instructions to be processed;

traversing instructions to be processed except the first instruction;

determining a currently traversed instruction to be processed and the first instruction as the instructions to be merged, in response to that the currently traversed instruction to be processed and the first instruction satisfy a second preset merging condition.

Optionally, the method further includes:

saving the instructions to be processed in a preset instruction queue;

serving an instruction to be processed in the preset instruction queue that satisfies at least one of the following conditions as the first instruction:

wherein, a second duration corresponding to the instruction to be processed is greater than a second time threshold, the second duration indicates a saved duration of the instruction to be processed in the preset instruction queue;

the instruction to be processed is at a set position in the preset instruction queue, the set position is a head position or a tail position.

Optionally, performing merging processing on the instructions to be merged, to obtain a merged instruction includes:

generating a merged processing result according to addresses to be accessed of respective instructions to be merged, and encapsulating the merged processing result in a set instruction format, to obtain the merged instruction.

Optionally, the method further includes:

respectively acquiring an amount of data to be accessed corresponding to respective instructions to be merged;

respectively adding the amount of data to be accessed corresponding to respective instructions to be merged to the merged processing result.

According to a second aspect of an embodiment of the present disclosure, there is provided a data access apparatus, applied to an electronic device, and the apparatus including:

an instruction acquisition module, configured to acquire a plurality of instructions to be processed, wherein each of the instructions to be processed includes an address to be accessed;

an instruction merging module, configured to determine instructions to be merged among the plurality of instructions to be processed, and perform merging processing on the instructions to be merged, to obtain a merged instruction; and an instruction sending module, configured to perform data access according to an address to be accessed corresponding to the merged instruction.

Optionally, the instruction merging module is configured to:

acquire a first instruction, wherein the first instruction is any instruction among the instructions to be processed;

traverse instructions to be processed except the first instruction, to obtain a second instruction, wherein an address to be accessed of the second instruction is indirectly continuous with an address to be accessed of the first instruction, and the address to be accessed of the second instruction is not continuous with the address to be accessed of the first instruction through addresses to be accessed of other instructions to be processed;

determine the second instruction and the first instruction as the instructions to be merged, in response to that the second instruction and the first instruction satisfy a first preset merging condition.

Optionally, the instruction merging module is further configured to:

acquire a storage interval, and/or acquire a total amount of currently accessed data, wherein the storage interval indicates a distance between the address to be accessed of the first instruction and the address to be accessed of the second instruction, the total amount of currently accessed data indicates a sum of amounts of data to be accessed corresponding to all instructions to be merged;

determine the second instruction and the first instruction as the instructions to be merged, in a case that the storage interval is less than a first preset threshold, and/or the total amount of currently accessed data is less than a second preset threshold.

Optionally, the instruction merging module is further configured to:

stop traversing the instructions to be processed except the first instruction, in a case that the total amount of currently accessed data is greater than or equal to the second preset threshold.

Optionally, the instruction merging module is further configured to:

acquire a first duration, and acquiring a first time threshold corresponding to the first instruction, wherein the first duration indicates a duration from a moment when it is determined to acquire the first instruction to a current moment;

continue traversing the instructions to be processed except the first instruction, in response to the first duration being less than the first time threshold;

stop traversing the instructions to be processed except the first instruction, in response to the first duration being greater than or equal to the first time threshold.

Optionally, the instruction merging module is further configured to:

acquire a difference value between the address to be accessed of the second instruction and the address to be accessed of the first instruction, wherein the address to be accessed is a logical address;

acquire a preset storage unit size;

obtain the storage interval according to the difference value and the preset storage unit size.

Optionally, the instruction merging module is further configured to:

acquire a first instruction, wherein the first instruction is any instruction among the instructions to be processed;

traverse instructions to be processed except the first instruction;

determine a currently traversed instruction to be processed and the first instruction as the instructions to be merged, in response to that the currently traversed instruction to be processed and the first instruction satisfy a second preset merging condition.

Optionally, the instruction merging module is further configured to:

save the instructions to be processed in a preset instruction queue;

serve an instruction to be processed in the preset instruction queue that satisfies at least one of the following conditions as the first instruction:

wherein, a second duration corresponding to the instruction to be processed is greater than a second time threshold, the second duration indicates a saved duration of the instruction to be processed in the preset instruction queue;

the instruction to be processed is at a set position in the preset instruction queue, the set position is a head position or a tail position.

Optionally, the instruction merging module is further configured to:

generate a merged processing result according to addresses to be accessed of respective instructions to be merged, and encapsulating the merged processing result in a set instruction format, to obtain the merged instruction.

Optionally, the instruction merging module is further configured to:

respectively acquire an amount of data to be accessed corresponding to respective instructions to be merged;

respectively add the amount of data to be accessed corresponding to respective instructions to be merged to the merged processing result.

According to a third aspect of an embodiment of the present disclosure, there is provided a non-transient computer-readable storage medium, having a computer program stored thereon, wherein the program implements steps of any of the data access method according to the first aspect when executed by a processor.

According to a fourth aspect of an embodiment of the present disclosure, there is provided a data access apparatus, including:

a processor; and a memory configured to store instructions executable by the processor, wherein the processor is configured to:

acquire a plurality of instructions to be processed, wherein each of the instructions to be processed includes an address to be accessed;

determine instructions to be merged among the plurality of instructions to be processed, and perform merging processing on the instructions to be merged, to obtain a merged instruction; and perform data access according to an address to be accessed corresponding to the merged instruction.

According to a fifth aspect of an embodiment of the present disclosure, there is provided a computer program product, including a computer program, wherein the program implements steps of any of the data access method according to the first aspect when executed by a processor.

The technical solutions provided by the embodiments of the present disclosure may include the following beneficial effects: when a plurality of instructions to be processed are obtained, the instructions to be merged among the plurality of instructions to be processed are determined, that is, at least two instructions to be processed that can be merged are determined, and the determined instructions to be merged are merged to obtain the merged instruction, which reduces the number of instructions and thereby reducing the instruction overhead. Data access is performed based on the address to be accessed corresponding to the merged instruction, such that a plurality of addresses to be accessed can be accessed based on one instruction. That is, a plurality of instructions to be processed can be processed concurrently, which improves the efficiency of instruction processing, and thereby effectively improving performance of the electronic device.

Other implementations of embodiments of the present disclosure will be apparent to those skilled in the art from consideration of the specification and practice of the present disclosure disclosed herein. The present disclosure is intended to cover any variation, use, or adaptation of embodiments of the present disclosure, which are in accordance with the general principles of embodiments of the present disclosure and include common general knowledge or conventional technical means in the art that are not disclosed in embodiments of the present disclosure. The specification and embodiments are illustrative only, and the real scope and spirit of embodiments of the present disclosure is defined by the appended claims.

It should be understood that embodiments of the present disclosure is not limited to the precise structures that have been described above and shown in the drawings, and various modifications and changes can be made without departing from the scope thereof. The scope of embodiments of the present disclosure is limited only by the appended claims.

What is claimed is:

1. A data access method, applied to an electronic device, and the method comprising:

acquiring a plurality of instructions to be processed, wherein each of the instructions to be processed comprises an address to be accessed;

determining instructions to be merged among the plurality of instructions to be processed, and performing merging processing on the instructions to be merged, to obtain a merged instruction;

performing data access according to an address to be accessed corresponding to the merged instruction, wherein determining instructions to be merged among the plurality of instructions to be processed comprises:

acquiring a first instruction, wherein the first instruction is any instruction among the instructions to be processed;

traversing the instructions to be processed, except the first instruction, to obtain a second instruction, wherein an address to be accessed of the second instruction is indirectly continuous with an address to be accessed of the first instruction, and the address to be accessed of the second instruction is not continuous with the address to be accessed of the first instruction through addresses to be accessed of other instructions to be processed; and determining the second instruction and the first instruction as the instructions to be merged in response to the second instruction and the first instruction satisfying a first preset merging condition, wherein the method further comprises:

acquiring a difference value between the address to be accessed of the second instruction and the address to be accessed of the first instruction, wherein the address to be accessed is a logical address;

acquiring a preset storage unit size; and obtaining a storage interval according to the difference value and the preset storage unit size, wherein the storage interval indicates a distance between the address to be accessed of the first instruction and the address to be accessed of the second instruction.

2. The method according to claim 1, wherein determining the second instruction and the first instruction as the instructions to be merged in response to the second instruction and the first instruction satisfying a first preset merging condition comprises:

acquiring at least one of the storage interval or a total amount of currently accessed data, wherein the total amount of currently accessed data indicates a sum of amounts of data to be accessed corresponding to all instructions to be merged;

determining the second instruction and the first instruction as the instructions to be merged, according to at least one of the following: the storage interval being less than a first preset threshold, or the total amount of currently accessed data being less than a second preset threshold.

3. The method according to claim 2, further comprising:

stopping traversing the instructions to be processed, except the first instruction, in a case where the total amount of currently accessed data is greater than or equal to the second preset threshold.

4. The method according to claim 1, further comprising:

acquiring a first duration and a first time threshold corresponding to the first instruction, wherein the first duration indicates a duration from a moment when it is determined to acquire the first instruction to a current moment;

continuing traversing the instructions to be processed, except the first instruction, in response to the first duration being less than the first time threshold;

stopping traversing the instructions to be processed, except the first instruction, in response to the first duration being greater than or equal to the first time threshold.

5. The method according to claim 1, further comprising:

acquiring a first instruction, wherein the first instruction is any instruction among the instructions to be processed;

traversing the instructions to be processed, except the first instruction;

determining a currently traversed instruction to be processed and the first instruction as the instructions to be merged in response to the currently traversed instruction to be processed and the first instruction satisfying a second preset merging condition.

6. The method according to claim 1, further comprising:

saving the instructions to be processed in a preset instruction queue;

serving an instruction to be processed in the preset instruction queue that satisfies at least one of the following conditions as the first instruction:

a second duration corresponding to the instruction to be processed is greater than a second time threshold, wherein the second duration indicates a saved duration of the instruction to be processed in the preset instruction queue; or the instruction to be processed is at a set position in the preset instruction queue, the set position is a head position or a tail position.

7. The method according to claim 1, wherein performing merging processing on the instructions to be merged, to obtain a merged instruction comprises:

generating a merged processing result according to addresses to be accessed of respective instructions to be merged, and encapsulating the merged processing result in a set instruction format, to obtain the merged instruction.

8. The method according to claim 7, further comprising:

acquiring an amount of data to be accessed corresponding to respective instructions to be merged;

adding the amount of data to be accessed corresponding to respective instructions to be merged to the merged processing result.

9. A data access apparatus, applied to an electronic device, and the apparatus comprising:

at least one processor; and a memory configured to store instructions executable by the at least one processor, wherein the at least one processor is configured to:

acquire a plurality of instructions to be processed, wherein each of the instructions to be processed comprises an address to be accessed;

determine instructions to be merged among the plurality of instructions to be processed, and perform merging processing on the instructions to be merged, to obtain a merged instruction;

perform data access according to an address to be accessed corresponding to the merged instruction;

acquire a first instruction, wherein the first instruction is any instruction among the instructions to be processed;

traverse the instructions to be processed, except the first instruction, to obtain a second instruction, wherein an address to be accessed of the second instruction is indirectly continuous with an address to be accessed of the first instruction, and the address to be accessed of the second instruction is not continuous with the address to be accessed of the first instruction through addresses to be accessed of other instructions to be processed; and determine the second instruction and the first instruction as the instructions to be merged in response to the second instruction and the first instruction satisfying a first preset merging condition;

acquire a difference value between the address to be accessed of the second instruction and the address to be accessed of the first instruction, wherein the address to be accessed is a logical address;

acquire a preset storage unit size; and obtain a storage interval according to the difference value and the preset storage unit size, wherein the storage interval indicates a distance between the address to be accessed of the first instruction and the address to be accessed of the second instruction.

10. The apparatus according to claim 9, wherein the at least one processor is further configured to:

acquire at least one of the storage interval or a total amount of currently accessed data, wherein the total amount of currently accessed data indicates a sum of amounts of data to be accessed corresponding to all instructions to be merged; and determine the second instruction and the first instruction as the instructions to be merged, according to at least one of the following: the storage interval being less than a first preset threshold, or the total amount of currently accessed data being less than a second preset threshold.

11. The apparatus according to claim 10, wherein the at least one processor is further configured to:

stop traversing the instructions to be processed, except the first instruction, in a case that the total amount of currently accessed data is greater than or equal to the second preset threshold.

12. The apparatus according to claim 9, wherein the at least one processor is further configured to:

acquire a first duration, and acquiring a first time threshold corresponding to the first instruction, wherein the first duration indicates a duration from a moment when it is determined to acquire the first instruction to a current moment;

continue traversing the instructions to be processed, except the first instruction, in response to the first duration being less than the first time threshold; and stop traversing the instructions to be processed, except the first instruction, in response to the first duration being greater than or equal to the first time threshold.

13. The apparatus according to claim 9, wherein the at least one processor is further configured to:

acquire a first instruction, wherein the first instruction is any instruction among the instructions to be processed;

traverse instructions to be processed, except the first instruction; and determine a currently traversed instruction to be processed and the first instruction as the instructions to be merged in response to the currently traversed instruction to be processed and the first instruction satisfying a second preset merging condition.

14. The apparatus according to claim 9, wherein the at least one processor is further configured to:

save the instructions to be processed in a preset instruction queue; and serve an instruction to be processed in the preset instruction queue that satisfies at least one of the following conditions as the first instruction:

a second duration corresponding to the instruction to be processed is greater than a second time threshold, wherein the second duration indicates a saved duration of the instruction to be processed in the preset instruction queue; and the instruction to be processed is at a set position in the preset instruction queue, the set position is a head position or a tail position.

15. The apparatus according to claim 9, wherein the at least one processor is further configured to:

generate a merged processing result according to addresses to be accessed of respective instructions to be merged, and encapsulate the merged processing result in a set instruction format, to obtain the merged instruction.

16. A non-transient computer-readable storage medium, having a computer program stored thereon, wherein the program implements steps of a data access method, when executed by a processor, wherein the method is applied to an electronic device and comprises:

acquiring a plurality of instructions to be processed, wherein each of the instructions to be processed comprises an address to be accessed;

determining instructions to be merged among the plurality of instructions to be processed, and performing merging processing on the instructions to be merged, to obtain a merged instruction;

performing data access according to an address to be accessed corresponding to the merged instruction, wherein determining the instructions to be merged among the plurality of instructions to be processed comprises:

acquiring a first instruction, wherein the first instruction is any instruction among the instructions to be processed;

traversing instructions to be processed, except the first instruction, to obtain a second instruction, wherein an address to be accessed of the second instruction is indirectly continuous with an address to be accessed of the first instruction, and the address to be accessed of the second instruction is not continuous with the address to be accessed of the first instruction through addresses to be accessed of other instructions to be processed; and determining the second instruction and the first instruction as the instructions to be merged, in response to the second instruction and the first instruction satisfying a first preset merging condition, wherein the method further comprises:

acquiring a difference value between the address to be accessed of the second instruction and the address to be accessed of the first instruction, wherein the address to be accessed is a logical address;

acquiring a preset storage unit size; and obtaining a storage interval according to the difference value and the preset storage unit size, wherein the storage interval indicates a distance between the address to be accessed of the first instruction and the address to be accessed of the second instruction.

* * * * *